(12) United States Patent
Abramson et al.

(10) Patent No.: US 6,574,790 B1
(45) Date of Patent: Jun. 3, 2003

(54) SYSTEM AND METHOD FOR INTERFACING AND SEPARATING FORMATTED CONTENT AND PROGRAM CODE

(75) Inventors: Nathan Abramson, Cambridge, MA (US); Jeffrey J. Vroom, Jamaica Plain, MA (US)

(73) Assignee: Art Technology Group, Inc., Cambridge, MA (US)

( * ) Notice: Subject to any disclaimer, the term of this patent is extended or adjusted under 35 U.S.C. 154(b) by 0 days.

(21) Appl. No.: 09/209,151

(22) Filed: Dec. 10, 1998

(51) Int. Cl.[7] .................................................. G06F 9/44
(52) U.S. Cl. ........................ 717/100; 717/101; 717/110
(58) Field of Search ............................... 717/5, 11, 100, 717/101, 110, 120, 107; 707/101, 102, 509, 513, 516; 705/26, 102; 709/201, 203

(56) References Cited

U.S. PATENT DOCUMENTS

| | | | | |
|---|---|---|---|---|
| 5,572,643 A | * | 11/1996 | Judson | 709/218 |
| 5,623,656 A | * | 4/1997 | Lyons | 707/10 |
| 5,649,186 A | * | 7/1997 | Ferguson | 514/557 |
| 5,659,729 A | * | 8/1997 | Nielsen | 707/3 |
| 5,710,887 A | | 1/1998 | Chelliah et al. | 705/26 |
| 5,745,360 A | * | 4/1998 | Leone et al. | 707/513 |
| 5,781,914 A | * | 7/1998 | Stork et al. | 707/506 |
| 5,809,250 A | * | 9/1998 | Kisor | 709/227 |
| 5,958,013 A | * | 9/1999 | King et al. | 709/227 |
| 5,987,482 A | * | 11/1999 | Bates et al. | 707/513 |
| 6,061,695 A | * | 5/2000 | Slivka et al. | 707/513 |
| 6,070,176 A | * | 5/2000 | Downs et al. | 707/513 |
| 6,230,318 B1 | * | 5/2001 | Halstead et al. | 717/108 |
| 6,253,228 B1 | | 6/2001 | Ferris et al. | 709/203 |
| 6,272,673 B1 | * | 8/2001 | Dale et al. | 717/100 |
| 6,314,439 B1 | * | 11/2001 | Bates et al. | 715/513 |
| 6,405,564 B1 | * | 6/2002 | Bowman-Amuah | 717/101 |
| 6,463,442 B1 | * | 10/2002 | Bent et al. | 707/103 |

FOREIGN PATENT DOCUMENTS

| | | |
|---|---|---|
| EP | 0 774 722 | 5/1997 |
| WO | WO 98/04985 | 2/1998 |

OTHER PUBLICATIONS

Ells, "Desigining usable hypertext document in Mosaic", ACM pp 165–167, 1994.*
Michalak et al., "Hypertext and the author/reader dialogue", ACM Hypertext, pp 174–182, Nov. 1993.*
Chiu et a.,m "A generic dynamic mapping wrapper for open hypertext system support of analytical applications", ACM Hypertext, pp 218–219, 1997.*

* cited by examiner

Primary Examiner—Anil Khatri
(74) Attorney, Agent, or Firm—Hale and Dorr LLP

(57) ABSTRACT

The system and method interface and separate formatted content and program code in connection with a content server system. The system includes a document preprocessor, a compiler, and an execution context manager. The document preprocessor parses and analyzes a formatted content document that contains program invocations and translates the program invocations into a procedure having program code suitable for compilation or intepretation. The preprocessor also encodes designated segments of the content document as subprocedures which are invoked within a context managed by the execution context manager. The execution context manager allows values to be mapped to named parameters so that the values are available to the invoked procedures and programs. As a result, the content server system provides separation between the formatted content and program code.

32 Claims, 4 Drawing Sheets

SYSTEM AND METHOD FOR INTERFACING AND SEPARATING FORMATTED CONTENT AND PROGRAM CODE

FIELD OF THE INVENTION

The present invention relates to the field of computer systems, and in particular to systems which serve content over a network.

BACKGROUND OF THE INVENTION

When a user requests infromation from a content server system 10, an example of which is shown in FIG. 1, such as a World Wide Web (web) server, some content 12 will be static in that it is provided to the user regardless of the request by the user, while other content is often dynamically generated by the server executing an embedded source code program 14. The content document to be provided to the user is parsed by a parser 15 to separate static and dynamic content. A verbatim pass-through 16 provides the static content and program code interpreter 18 interprets the embedded source code program to obtain the dynamic content. Alternatively, the program code may be compiled.

In one example, a web server with an application for displaying a stock quote in response to a request from a user dynamically generates a HyperText Markup Language (HTML) page by executing a source code program that looks up the price of the stock and properly formats the information into valid HTML. A box or line for displaying the stock quote may be static content that is the same regardless of which stock quote is entered.

A common technique for generating properly formatted content is to embed HTML formatting directives (tags) directly into the source program code. For example, the following Java code fragment might display a single quote:

out.println("<B>"+getCompanyName( )+"</B>");
out.println("<I>"+getCompanySymbol( )+"</I>");
out.println("$"+getFormattedPrice( ));

In the above example, the text contained between the "<" and ">" characters are HTML tags that produce the desired formatting, while the program code performs the operation of looking up the price and the company name for a stock symbol. When executed, the above program code might yield the following HTML for the fictitious company "Acme Widgets":

<B>Acme Widgets, Inc.</B> <I>ACMW</I> $42 1/8

When viewed in an HTML browser, the browser would interpret the tags <B> and <I> as bolding and italic directives yielding the following rendition:

Acme Widgets, Inc. ACMW $42⅛

As a further example, it may be desirable to modify the above formatting so that the price is bolded and the company name is not. Such a modification to the formatting would require that a programmer modify the Java source code as follows:

out.println(getCompanyName( ));
out.println("<I>"+getCompanySymbol( )+"</I>");
out.println("<B>$"+getFormattedPrice( )+"</B>");

The resulting rendered HTML would appear as follows:
Acme Widgets, Inc. ACMW $42⅛

This technique of embedding the content formatting directives, such as HTML tags, directly within source program code means that even the simplest change to the desired formatting of the content requires modification, compilation, and testing of the source program code. Furthermore, it is difficult to reuse the source program code in different applications as the generated formatting tags may conflict with the desired format of the new application. Moreover, the generated content is generally embedded within a considerable amount of static content such as page headers, paragraph titles, and layout directives, and such static content must interact cooperatively with the generated content in order for the entire page to be generated correctly. These issues increase the cost of development and maintenance of such applications.

SUMMARY OF THE INVENTION

A system and method for interfacing and separating formatted content and program code enables modifications to the formatted content to be made independently of the program code and provides greater reusability of the program code. The system and method have particular application to implementing servers for dynamic web content and applications.

The system and method interface and separate formatted content and program code in connection with a content server system. The system includes a document preprocessor, a compiler, and an execution context manager. The document preprocessor parses and analyzes a formatted content document that contains program invocations and translates the program invocations into a procedure having program code suitable for compilation or intepretation. The preprocessor also encodes designated segments of the content document as subprocedures which are invoked within a context managed by the execution context manager. The execution context manager allows values of parameters to be mapped to named parameters so that the values are available to the invoked procedures and programs. As a result, the content server system provides separation between the formatted content and program code.

The modifications to the formatting of dynamically generated content can thus be separated from the program code that executes the functional logic underlying the generation, such that no formatting directives are embedded into the program code. Such separation enables formatting modifications to be made independently of the program code and allows the code to be reused in different content documents with different formatting requirements. Other features and advantages will be apparent from the following detailed description, drawings, and claims.

DETAILED DESCRIPTION

A system and method for interfacing and separating formatted content and program code enables modifications to the formatted content to be made independently of the program code and provides greater reusability of the program code. The system and method have particular application to implementing servers for dynamic web content and applications. In the following description for purposes of explanation, specific numbers, materials, and configurations are set forth in order to provide a thorough understanding of the present invention. However, it will be apparent to one skilled in the art that the present invention may be practiced without the specific details.

Figure 1:
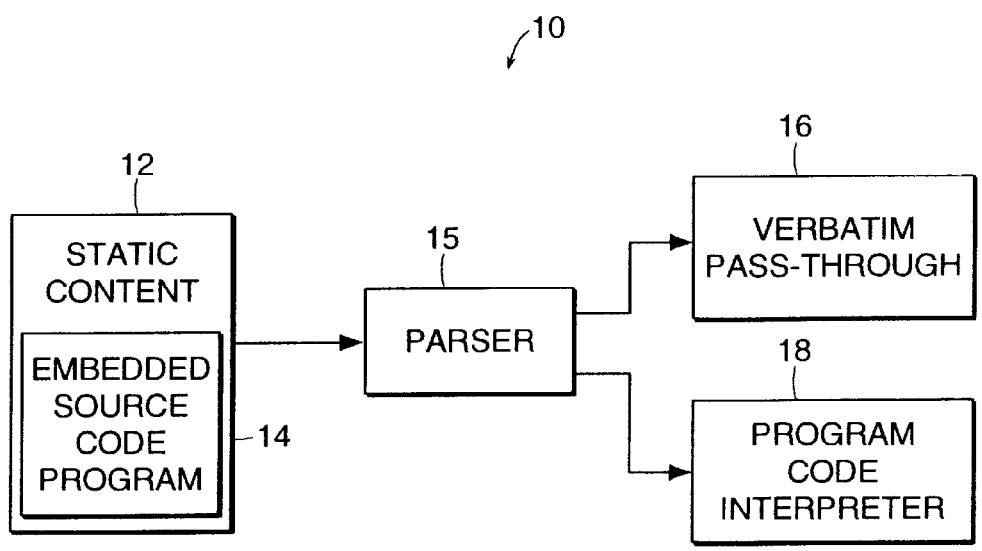
FIG. 1 is a block diagram showing a prior art approach to serving dynamically generated content.
Figure 2:
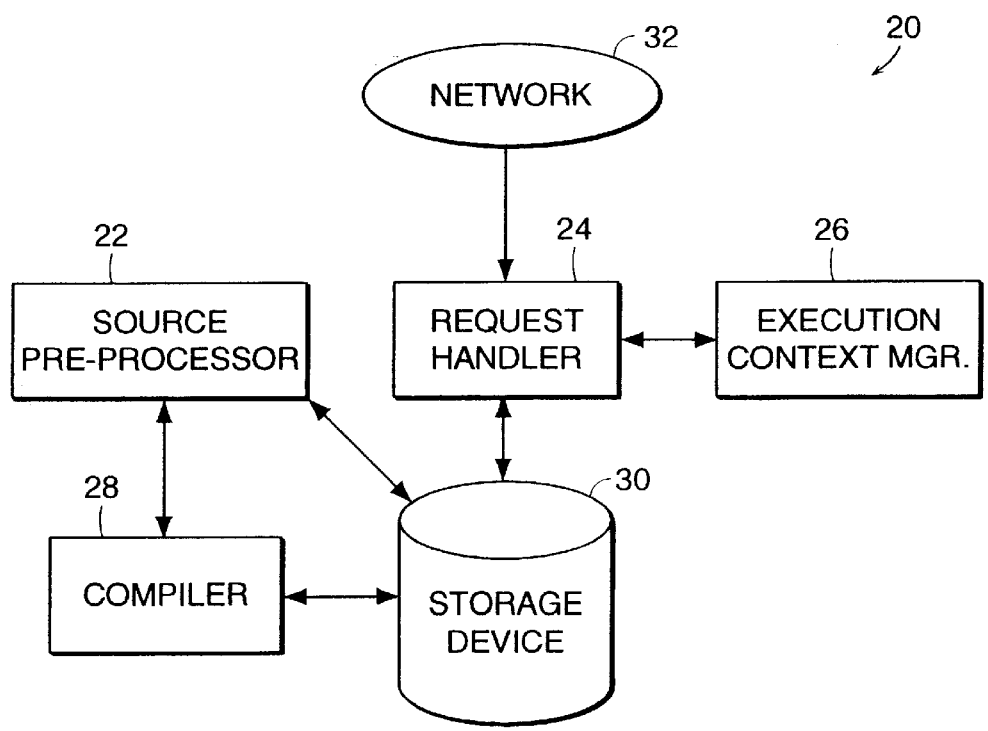
FIG. 2 is a block diagram of a content server system incorporating the system and method of the present invention.

Referring to FIG. 2, a content server system 20 according to the present invention has a document preprocessor 22, a request handler 24, and an execution context manager 26. Server system 20 also has a compiler 28, a storage device 30, and a network 32. Preprocessor 22 is coupled to compiler 28 and storage device 30. Request handler 24 is coupled to execution context manager 26, network 32, and storage device 30.

Compiler 28 is a standard component of Sun Microsystems, Inc.'s commercially available Java Development Kit software, and the storage device and network systems are standard components of any common computer and operating system such as a Sun Microsystems server running the SUN SOLARIS operating system or an IBM PC compatible computer running the Microsoft WINDOWS NT operating system (SUN SOLARIS and WINDOWS NT are registered trademarks of Sun Microsystems, Inc. and Microsoft Corp., respectively).

Except for the manner they are used to practice the present invention, the compiler, the storage device, and the network, are intended to represent a broad category of these elements found in many computer systems. The constitutions and basic functions of these elements are well known and will not be further described here.

Figure 3:
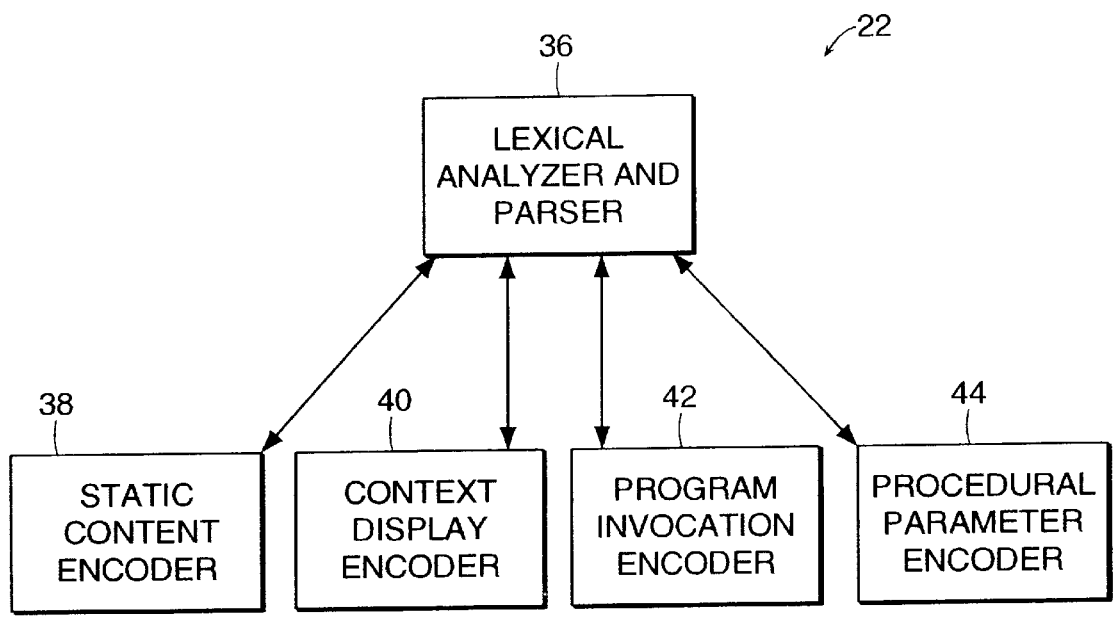
FIG. 3 is a block diagram of an embodiment of the document preprocessor shown in FIG. 2.

Referring to FIG. 3, document preprocessor 22 includes a lexical analyzer and parser 36 coupled to each of a static content encoder 38, a context display encoder 40, a program invocation encoder 42, and a procedural parameter encoder 44. Together, these components transform the content document into a procedure having program code suitable for compilation or interpretion.

Lexical analyzer and parser 36 examines the entire content document, dividing the content into four categories: static content, context display directives, program invocation directives, and procedural parameter directives. This division of the content is performed using well-known parsing and analysis techniques. Static content is sent to static content encoder 38, context display directives are sent to context display encoder 40, program invocation directives are sent to program invocation encoder 42, and procedural parameter directives are sent to procedural parameter encoder 44.

All four encoders produce program code. The static content encoder transforms the static content into instructions that output the verbatim content when executed. The context display encoder emits instructions that looks up and outputs the value of a named context parameter. The program invocation encoder emits instructions that sets up an execution context and invokes a program code module. The procedural parameter encoder emits instructions that bind a context parameter to a program code procedure that is itself generated by the document preprocessor. The document preprocessor also encapsulates the processed content within any necessary program code required to create a valid compilation module In the invention's preferred embodiment, the content formatting language is HTML (HyperText Markup Language), and the directives described above are designated by special HTML-style tags. More specifically, context display directives are designated by the "<VALUEOF>" tag, program code invocation directives are designated by the "<DROPLET>" tag, and procedural parameter directives are designated by the "<OPARAM>" tag.

Consider the following HTML and special tags:

```
<H1>Your Quote</H1>
<DROPLET name="stockQuote">
    <OPARAM name="output">
        <B> <VALUEOF name="company"></VALUEOF> </B>
        <I> <VALUEOF name="symbol"></VALUEOF> </I>
        $ <VALUEOF name="price"></VALUEOF>
    </OPARAM>
</DROPLET>
```

The text from the beginning up to the <DROPLET> tag is standard static HTML and would be encoded by the static content encoder as instructions to emit the text verbatim—in this case, to output a heading labeled "Your Quote". The <DROPLET> tag is the program code invocation directive indicating the invocation of a program component named "stockQuote". The <OPARAM> tag is the procedural parameter directive indicating that the program code generated by processing the enclosed text before the <OPARAM> tag is a procedure bound to the name "output".

Thus the <DROPLET> and <OPARAM> tags above are encoded as instructions to call the execution context manager to bind the "output" parameter, and to invoke the program component "stockQuote." The text enclosed within the <OPARAM> tag is processed in the same manner as any other content text, i.e., it is parsed, analyzed, and sent to the same encoders, and may itself contain static content, context display, program invocation, and procedural parameter directives.

The <VALUEOF> tags are context display directives and are encoded as instructions to lookup the variables "company", "symbol", and "price" within the current execution context and output them.

In order for the above example to render the desired quote, the stockQuote program component is programmed to work cooperatively with the execution context manager to create additional bindings for the "company", "symbol", and "price" parameters and to execute the "output" procedural parameter.

An exemplary implementation of a stockQuote program is shown below (not a complete code example):

request.setParameter("company", getCompanyName( ));
    request.setParameter("symbol", getCompanySymbol( ));
    request.setParameter("price", getFormattedPrice( ));
    request.serviceParameter("output", request, response);

The first three lines of the above program compute the company name, symbol, and price and bind these values to the "company", "symbol", and "price" context parameters. The final line calls the execution context manager to invoke the program code bound to the "output" context parameter. This code, generated as described above, outputs the information with the desired format.

Figure 4:
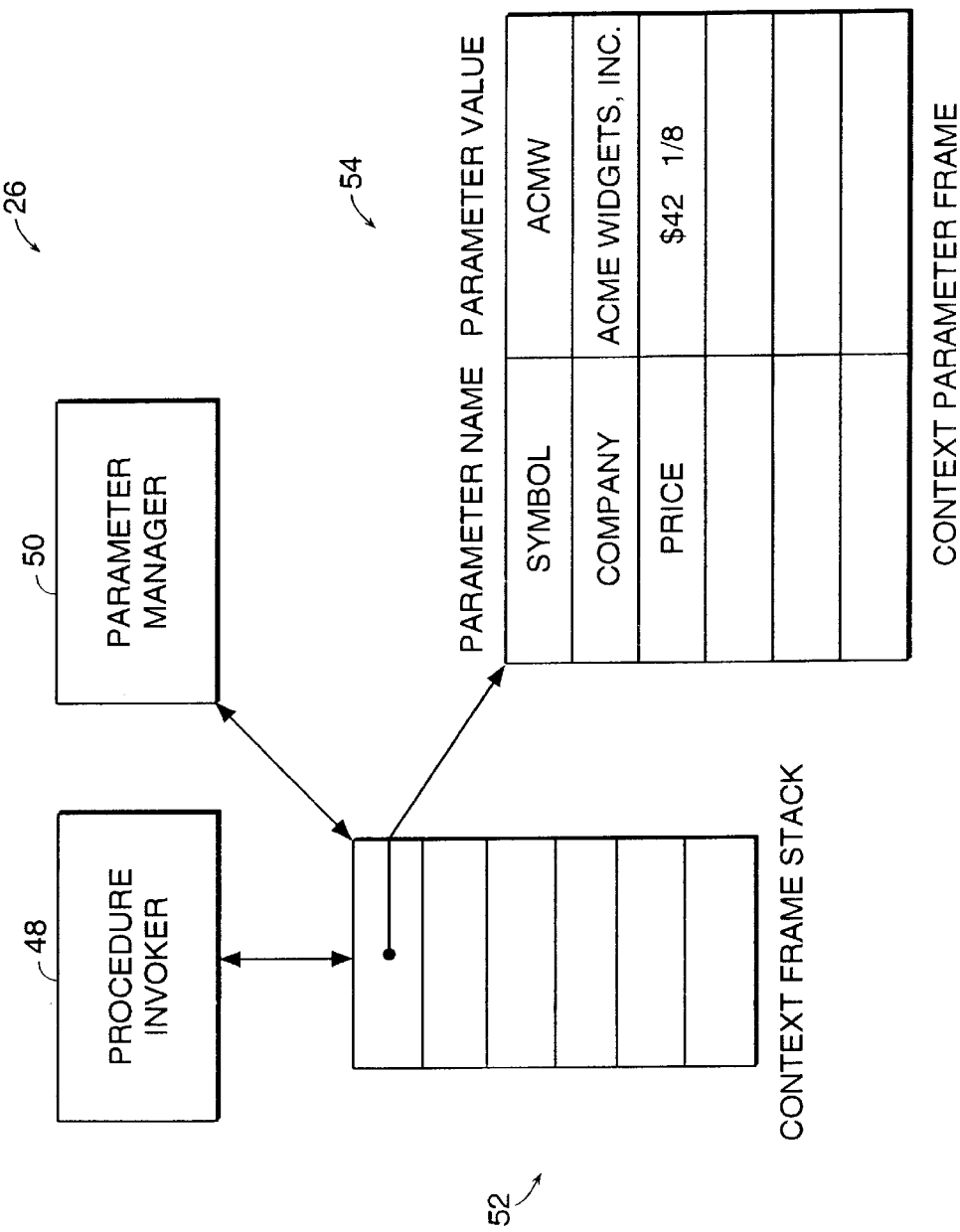
FIG. 4 is a block diagram of an embodiment of the execution context manager shown in FIG. 2.

Referring to FIG. 4, an embodiment of execution context manager 26 includes a procedure invoker 48, a parameter manager 50, a context frame stack 52, and one or more tables of context parameter frames 54. Context frame stack 52 is coupled to procedure invoker 48 and parameter manager 50, and has a pointer to parameter names and values in context parameter frame 54.

Procedure invoker 48 invokes a procedure by creating a new context parameter frame and pushing the frame with the request on top of context frame stack 52. Parameter manager 50 adds parameter name/value pairs to the topmost context parameter frame and the procedure is invoked. In the example in the background above, context parameter frame will have the entries as shown in FIG. 4.

The procedure can execute instructions to call parameter manager 50 to add new context parameter values and to look up parameter values. Parameter manager 50 always adds new values to the topmost context parameter frame, but when called to look up a value, manager 50 searches each from the top of stack 52 downwards and returns the first value found. When the procedure returns, the pointer to the frame is popped from the top of the stack, and the frame is discarded, thus restoring the stack to its original state.

Figure 5:
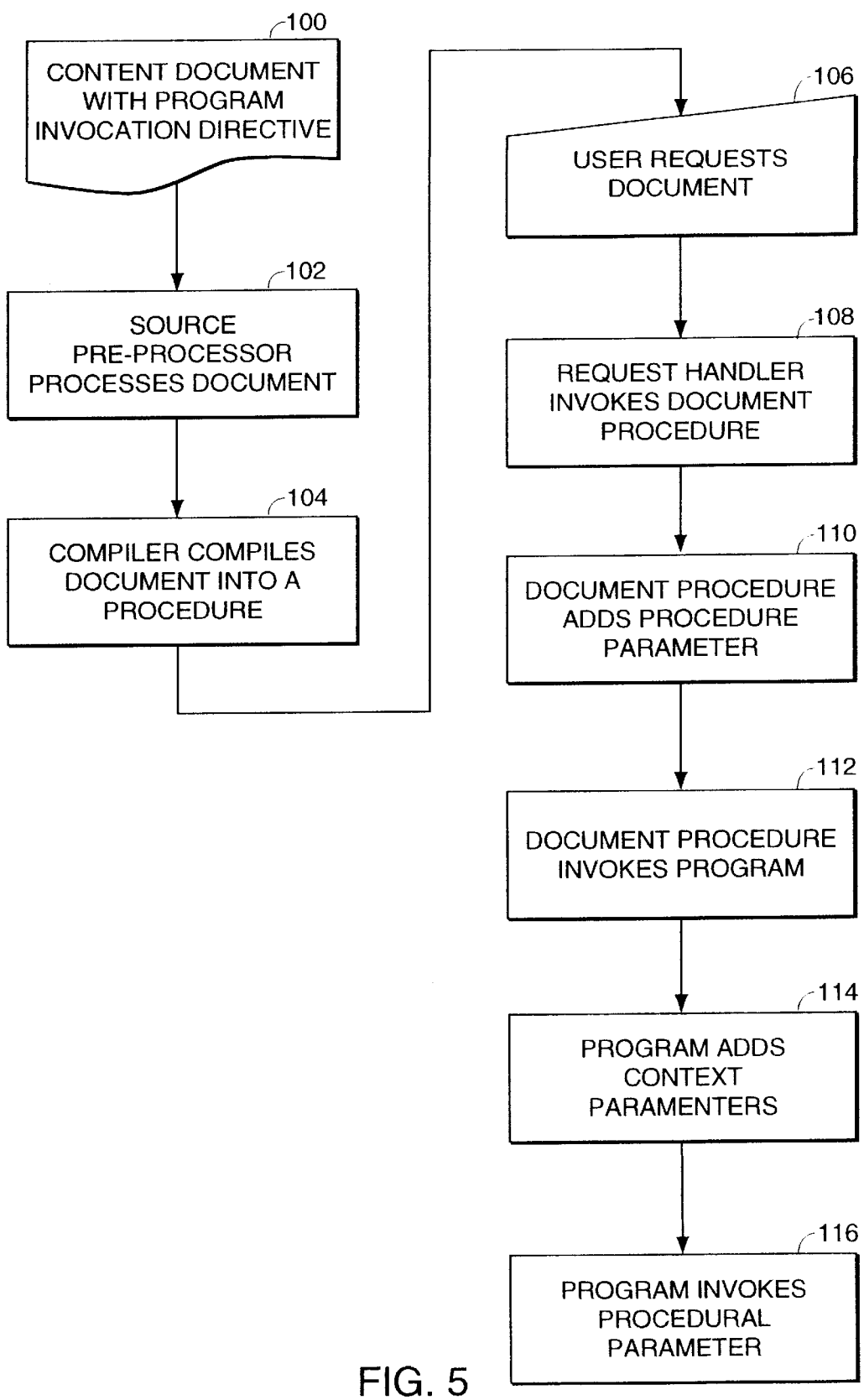
FIG. 5 is a flow chart of a method according to one embodiment of the present invention.

Referring to FIG. 5, an embodiment of the process of the present invention is shown for use with a content document with a program invocation directive (100). The document preprocessor processes the document containing program invocation, procedural parameters, and context display directives by transforming the document into a procedure with subprocedures comprised of program code instructions as previously described (102). The program code is then compiled to an executable form (104).

When a user requests the document (106), the request handler invokes the procedure previously generated and compiled (108). This procedure calls the execution context manager to add the procedural parameter to the current context (110), and invokes the program indicated by the program invocation directive (112). The invoked program in turn calls the request context manager to add further context parameters (114) and invokes the procedural parameter added in the previous step (116). This procedure, which was generated from the procedural parameter directive within the original content document, then has access to all of the parameters added to the execution context in the previous steps.

Thus in the exemplary code fragment in the background above, the program code (whether in Java, Visual Basic, or some other language or script) retrieves the stock price and symbol from the appropriate data source and formats the output according to the tags embedded within the code fragment. To change the format, the code must be changed.

In the system of the present invention, however, the program code retrieves the company name, symbol, and price and then puts those values in the context parameter frame. These values from the context parameter frame are then used by the HTML as set out above (beginning with <H1>) to format the output. As a result, the format of the output can be changed in the HTML only without requiring that the program code be modified and recompiled.

The present invention also allows program code to be more easily reused. The same program code can be used with multiple different HTML formatting directives, such that stock quotes can be delievered to different parties with a different format. In this case, the HTML is different while the program code is the same.

While the present invention has been described in terms of presently preferred and alternate embodiments, those skilled in the art will recognize that the invention is not limited to the embodiments described. The system and method of the present invention can be practiced with modification and alteration within the spirit and scope of the appended claims. The description is thus to be regarded as illustrative instead of limiting on the present invention. For example, the target program language can be either interpreted (e.g., Visual Basic) or compiled (Java). The generated program code and the program being invoked may, but need not be, in the same language. The present invention has been described in conjunction with the example of a stock quote program, but the system and method of the present invention can be used with other types of content providing that includes executing a program, such as any access to a database in response to a request, e.g., a server for providing white pages information or maps, or a server for providing movie listings that are local to the user, or for requesting information about the weather in any specified location. The present invention is thus useful in many contexts.

What is claimed is:

1. A method including:
   a server processing a hypertext document containing formatting instructions and instructions to invoke program code, and
   in response to a request from a user,
   executing the program code,
   storing values resulting from the program code execution, and
   using the formatting instructions to deliver the stored values to the user in a desired format.

2. The method of claim 1, wherein the program code is compiled.

3. The method of claim 1, wherein the program code is interpreted.

4. The method of claim 1, wherein the program code is embedded in the hypertext document.

5. The method of claim 1, wherein the processing includes parsing the hypertext document into static content, context display, program invocation, and procedural parameters.

6. The method of claim 1, wherein the formatting instructions deliver the values through context display directives.

7. The method of claim 6, wherein the formatting instructions for delivering the values are encapsulated as a procedural parameter which is made available to the program code, and which the program code may invoke to produce output.

8. The method of claim 1, wherein the formatting instructions for delivering the values are encapsulated as a procedural parameter which is made available to the program code, and which the program code may invoke to produce output.

9. The method of claim 1, wherein each of the values produced by the execution of the program code is associated with a parameter name.

10. The method of claim 9, wherein the values produced by the execution of the program code and their associated parameter names are stored in a table.

11. The method of claim 9, wherein the formatting instructions obtain the values produced by the execution the program code by referring to the values by their associated parameter names.

12. The method of claim 11, wherein the formatting instructions deliver the values through context display directives.

13. The method of claim 12 , wherein the formatting instructions for delivering the values are encapsulated as a procedural parameter which is made available to the program code, and which the program code may invoke to produce output.

14. A system including:
   a preprocessor for processing a hypertext document that has formatting instructions and instructions to invoke program code; and
   a request handler and execution context manager, responsive to a request from a user, for executing the program code, storing values resulting from the program code execution, and causing the formatting instructions to use the stored values to deliver to the user in a desired format.

15. The system of claim 14, wherein the preprocessor has a parser and encoders for providing program code for static content, context display, program invocation, and procedural parameters.

16. The system of claim 14, wherein the preprocessor produces Java program code and HTML formatting instructions.

17. The system of claim 16, wherein the execution context manager includes a table for holding parameter names and values.

18. A method including processing a hypertext document with formatting instructions and instructions to invoke program code, wherein in response to a user request, the program code is executed to produce values for display, and the formatting instructions format the values for display, wherein the program code does not include formatting instructions so that the formatting instructions can be changed without changing the program code.

19. A method including:
processing a first hypertext document in response to a request from a user, the processing including identifying static content and dynamic content, the dynamic content being associated with program code;
executing the program code to obtain dynamic content values;
storing values resulting from the program code execution; and
using formatting instructions not included in the program code to deliver to the user the stored values in a desired format, thereby separating the program code from the formatting instructions and allowing the formatting instructions to be changed without changing the program code used to obtain the values.

20. The method of claim 19, wherein the values returned by the execution of the program code are stored in a table including the parameter name and value.

21. The method of claim 20, wherein the processing includes parsing the hypertext document and dividing content into static content, context display, program invocation, and procedural parameters.

22. The method of claim 21, wherein each of the static content, context display, program invocation, and procedural parameters are provided to a respective encoder, the static content encoder transforming the static content into instructions that output the content verbatim, the context display encoder emitting instructions that look up and output the value of a named context parameter, the program invocation encoder emitting instructions that set up an execution context and invoke a program code module, and the procedural parameter encoder emitting instructions that bind a context parameter to a program code procedure generated by the document processor.

23. The method of claim 22, wherein the document has Hypertext Markup Language (HTML) tags, including a first tag for indicating the invocation of a program component identified within that tag, a second tag that has a procedural parameter directive that indicates that program code generated by processing text enclosed within the tag is a procedure bound to a named output, and a third tag that is a context display directive encoded as instructions to look up named variables.

24. The method of claim 23, wherein the values returned by the execution of the program code are stored in a table including the parameter name and value.

25. The method of claim 21, wherein the values returned by the execution of the program code are stored in a table including the parameter name and value.

26. The method of claim 22, wherein the values returned by the execution of the program code are stored in a table including the parameter name and value.

27. The method of claim 19, wherein the formatting instructions include one or more of boldface type or italics.

28. A system including:
program code which, when executed, generates values for one or more parameters;
a first hypertext document with static and dynamic content and including a program code invocation directive for identifying the program code; and
a table for storing the values for the one or more parameters;
formatting instructions for displaying the one or more parameters;
wherein the formatting instructions are separate from the program code, such that the formatting instructions can be changed without altering the program code.

29. The system of claim 28, wherein the formatting instructions can be changed without changing the program code.

30. The system of claim 28, further comprising a second hypertext document, different from the first hypertext document, for calling the program code having formatting instructions different from those in the first hypertext document, the first and second hypertext documents using the same program code but providing outputs with different formats.

31. The system of claim 28, further comprising a processor for processing the first hypertext document including parsing the hypertext document and dividing content into static content, context display, program invocation, and procedural parameters.

32. The system of claim 31, wherein each of the static content, context display, program invocation, and procedural parameters are provided to a respective encoder, the static content encoder transforming the static content into instructions that output the content verbatim, the context display encoder emitting instructions that look up and output the value of a named context parameter, the program invocation encoder emitting instructions that set up an execution context and invoke a program code module, and the procedural parameter encoder emitting instructions that bind a context parameter to a program code procedure generated by the document processor.

* * * * *